3,031,415
ELECTROLUMINESCENT PHOSPHOR AND
PROCESS FOR MAKING SAME
George H. Morrison, Westbury, and Frank C. Palilla, Maspeth, N.Y., assignors to Sylvania Electric Products Inc., a corporation of Delaware
No Drawing. Filed Nov. 16, 1959, Ser. No. 852,959
4 Claims. (Cl. 252—301.6)

Our invention relates to electroluminescent phosphors and processes for making the same.

We have invented a new electroluminescent phosphor which, depending upon its processing, is capable of emitting blue, white or yellow light.

Accordingly, it is an object of our invention to provide a new electroluminescent phosphor having a spectral range of light emission which can be selectively varied over a substantial portion of the entire visible spectral range.

Another object is to provide a new process for producing a blue, white or yellow emitting electroluminescent phosphor.

Still another object is to provide a new electroluminescent phosphor which, when incorporated into an electroluminescent lamp and electrically excited, produces a bright white light with relatively high efficiency.

These and other objects of our invention will either be explained or will become apparent hereinafter.

In accordance with the principles of our invention, the starting material is a copper activated, chloride coactivated cathodoluminescent phosphor of the zinc sulfide type. (This type of phosphor can be composed either of zinc sulfide or zinc-cadmium sulfide.)

This starting material is mixed with the following: zinc sulfate, copper sulfate and a manganese salt. The amounts added, as expressed as a percentage by weight of the starting material, are as follows: zinc sulfate, 5–100%; the copper content of the copper sulfate, 0.1%–10%; and the manganese content of the manganese salt, 0–5%.

This mixture is fired at a temperature of 700°–900° C., and after cooling is washed with an alkali cyanide solution to produce the desired electroluminescent phosphor.

When the initial copper addition is low, and no manganese is present, the resultant product is a blue emitting electroluminescent phosphor. As manganese is added within the ranges indicated, the color spectrum is shifted from blue, to white, to yellow. For a fixed amount of copper, an increase in the zinc sulfate content (within the ranges indicated) results in a phosphor of increased brightness and efficiency. Further, as the zinc sulfate content is increased, a larger manganese addition is required.

Analysis of the electroluminescent phosphors so produced showed that the copper content of these phosphors was always about .03%–.05% by weight of the phosphor, regardless of the amount of copper sulfate added in the initial step of the process. Apparently, only a certain proportion of the added copper is incorporated into the base material, the cyanide wash removing all excess copper.

Illustrative embodiments of our invention will now be described in more detail with reference to the examples which follow.

*Example I*

20 grams of a copper activated, chloride coactivated cathodoluminescent zinc sulfide phosphor (i.e. cadmium-free phosphor activated with .01%–.03% copper and commercially designated as a Type P–2 phosphor) was blended with 0.5 gram of copper sulfate (a 1% addition of copper), 7 grams of zinc sulfate (35% by weight of the phosphor) and 0.21 gram of manganese carbonate (a 0.5% addition of manganese). The mixture was loaded into a covered quartz crucible which, in turn, was placed in a muffle furnace and fired at a temperature of 800° C. for a period of 40 minutes. The crucible was then removed from the furnace and permitted to cool to room temperature.

The fired mixture was then removed from the crucible, washed first with 30-ml. of warm acetic acid (50% concentration) and thereafter washed successively with three separate 30-ml. portions of warm distilled water.

Finally, the mixture was washed with a 30-ml. portion of a hot solution of potassium cyanide (5% concentration). Thereafter, the material was washed with water, heated to dryness at a temperature of 130° C. and sieved through a 325 mesh screen.

The product was incorporated into a 5 mil gap 1 inch x 1 inch demountable electroluminescence test cell, using castor oil as a dielectric with a loading of 2 parts by weight of phosphor to 1 part by weight of castor oil. Alternating voltages ranging in value from 100 to 600 volts and ranging in frequency from 60 to 400 cycles per second were applied to the cell. White electroluminescent emission ensued. The shade of the white emission ranged from a warm (incandescent) white at the lower voltages and frequencies to a cool (daylight) white at the higher voltages and frequencies. At a voltage of 600 volts R.M.S. and a frequency of 60 cycles per second, the brightness of the cell was found to be about 2 foot lamberts, the cell efficiency being about 2–3 lumens per watt.

The above process was repeated using various percentage additions of zinc sulfate. As the addition was decreased from 35% down to about 5%, the brightness and efficiency of the cell decreased. The 5% addition appeared to be the approximate lower limit for useful brightness and efficiency.

Further, as the zinc sulfate addition was increased toward 100%, it was found that higher manganese additions were required to produce equivalent cell brightness and efficiency, the manganese addition for the 100% zinc sulfate addition being about 1.5%.

It was found that the firing temperature could be varied from 700° C.–900° C. without adverse effects.

*Example II*

The initial process set forth in Example I was repeated but with no manganese addition. A blue emitting electroluminescent phosphor was produced.

*Example III*

The initial process set forth in Example I was repated, using a 5% manganese addition. A yellow emitting electroluminescent phosphor was produced.

We have found that the type P–2 zinc-cadmium sulfide cathodoluminescent phosphors can be used in any of the above examples as long as these cadmium containing phosphors are finely ground, as for example by ball milling, prior to mixing the various additives therewith.

Further we found that for any emitted color, decreasing the copper sulfate addition from about 1% by weight of copper to a minimum of about 0.1% by weight, changed the shade of the emitted color as, for example, from white to pinkish white. Similarly, increasing the copper addition from about 1% to a maximum of about 10% again changed the shade of the emitted color, as for example from white to a cream white.

What is claimed is:
1. A process for producing an electroluminescent phosphor from a copper activated, chloride coactivated cathodoluminescent phosphor selected from the group consisting of zinc sulfide and zinc-cadmium sulfite, said process comprising the steps of mixing said cathodoluminescent phosphor with copper sulfate, zinc sulfate and a man- ganese salt, the amount of copper added, as expressed in a percentage by weight of the cathodoluminescent phosphor, falling within the range 0.1%–10%, the amount of manganese added falling within the range 0–5%, the amount of zinc sulfate added falling within the range 5%–100%; firing said mixture at a temperature falling within the approximate range 700°–900° C.; and washing said fired mixture with an alkali cyanide solution to remove all excess copper therefrom, thus producing said electroluminescent phosphor.

2. A process for producing a white emitting electroluminescent phosphor from a copper activated, chloride coactivated cathodoluminescent phosphor selected from the group consisting of zinc sulfide and zinc-cadmium sulfide, said process comprising the steps of mixing said cathodoluminescent phosphor with copper sulfate, zinc sulfate and a manganese salt, the amount of copper added, as expressed in a percentage by weight of the cathodoluminescent phosphor, being about 1%, the amount of manganese added being about 0.5%, the amount of zinc sulfate added being about 35%; firing said mixture at a temperature falling within the approximate range 700°–900° C.; and washing said fired mixture with an alkali cyanide solution to remove all excess copper therefrom, thus producing said electroluminescent phosphor.

3. A process for producing a blue emitting electroluminescent phosphor from a copper activated, chloride coactivated cathodoluminescent phosphor selected from the group consisting of zinc sulfide and zinc-cadmium sulfide, said process comprising the steps of mixing said cathodoluminescent phosphor with copper sulfate and zinc sulfate, the amount of copper added, as expressed in a percentage by weight of the cathodoluminescent phosphor, falling within the range 0.1%–10%, the amount of zinc sulfate added falling within the range 5%–100%; firing said mixture at a temperature falling within the approximate range 700°–900° C.; and washing said fired mixture with an alkali cyanide solution to remove all excess copper therefrom, thus producing said electroluminescent phosphor.

4. A process for producing a yellow emitting electroluminescent phosphor from a copper activated, chloride coactivated cathodoluminescent phosphor selected from the group consisting of zinc sulfide and zinc-cadmium sulfide, said process comprising the steps of mixing said cathodoluminescent phosphor with copper sulfate, zinc sulfate and a manganese salt, the amount of copper added, as expressed in a percentage by weight of the cathodoluminescent phosphor, being about 1%, the amount of manganese added being about 5%, the amount of zinc sulfate added being about 35%; firing said mixture at a temperature falling within the approximate range 700°–900° C.; and washing said fired mixture with an alkali cyanide solution to remove all excess copper therefrom, thus producing said electroluminescent phosphor.

References Cited in the file of this patent

UNITED STATES PATENTS

| | | |
|---|---|---|
| 2,743,238 | Hunt et al. | Apr. 24, 1956 |
| 2,774,739 | Butler et al. | Dec. 18, 1956 |
| 2,821,509 | Hunt et al. | Jan. 28, 1958 |
| 2,880,346 | Nicoll et al. | Mar. 31, 1959 |
| 2,911,553 | Joormann et al. | Nov. 3, 1959 |
| 2,919,250 | Butler et al. | Dec. 29, 1959 |

FOREIGN PATENTS

| | | |
|---|---|---|
| 782,095 | Great Britain | Sept. 4, 1957 |

OTHER REFERENCES

Partington: Text Book of Inorganic Chemistry, 6th ed., Macmillan and Co. Limited, London, 1950, page 783.